(12) United States Patent
Tung

(10) Patent No.: US 9,116,671 B2
(45) Date of Patent: Aug. 25, 2015

(54) STORAGE DEVICE WITH WIRELESS ROUTER FUNCTION

(71) Applicant: Power Quotient International Co., Ltd., New Taipei (TW)

(72) Inventor: Hung-Chi Tung, New Taipei (TW)

(73) Assignee: Power Quotient International Co., Ltd., New Taipei (TW)

( * ) Notice: Subject to any disclaimer, the term of this patent is extended or adjusted under 35 U.S.C. 154(b) by 316 days.

(21) Appl. No.: 13/656,952

(22) Filed: Oct. 22, 2012

(65) Prior Publication Data
US 2013/0242962 A1    Sep. 19, 2013

(30) Foreign Application Priority Data

Mar. 14, 2012  (TW) .............................. 101204575 U

(51) Int. Cl.
*G06F 1/16* (2006.01)
*H04L 12/773* (2013.01)

(52) U.S. Cl.
CPC .............. *G06F 1/1698* (2013.01); *H04L 45/60* (2013.01)

(58) Field of Classification Search
USPC ....................................................... 370/338
See application file for complete search history.

(56) References Cited

U.S. PATENT DOCUMENTS

| | | | | |
|---|---|---|---|---|
| 6,157,958 | A * | 12/2000 | Armitage et al. | 709/250 |
| 2006/0203757 | A1* | 9/2006 | Young et al. | 370/315 |
| 2007/0076645 | A1* | 4/2007 | VanDrunen | 370/315 |
| 2007/0110017 | A1* | 5/2007 | Fulknier et al. | 370/338 |
| 2007/0217436 | A1* | 9/2007 | Markley et al. | 370/401 |
| 2008/0025245 | A1* | 1/2008 | Sweeney et al. | 370/317 |
| 2008/0123566 | A1* | 5/2008 | Jung | 370/271 |
| 2009/0003373 | A1* | 1/2009 | Morrissey et al. | 370/445 |
| 2009/0003374 | A1* | 1/2009 | Morrissey et al. | 370/463 |
| 2009/0168787 | A1* | 7/2009 | Ansari et al. | 370/401 |
| 2011/0228765 | A1* | 9/2011 | Yukie et al. | 370/352 |
| 2011/0274093 | A1* | 11/2011 | Sing et al. | 370/338 |

* cited by examiner

*Primary Examiner* — Jenee Williams
(74) *Attorney, Agent, or Firm* — Lin & Associates IP, Inc.

(57) ABSTRACT

A storage device with wireless router function includes a main module having a base board, and a network connector. A USB controller, a memory and a router chip are located on the base board. One end of the base board is equipped with a first connector. The USB controller, the memory and the first connector are coupled with the router chip. The storage device performs a data storage function via electrically plugging the first connector to an electronic product and accessing data in the memory. The network connector is electrically connected to the router chip of the base board. The network connector is capable of being further connected to a local area network via a wire link so as to make the storage device perform a wireless router function through the router chip providing a wireless LAN to wirelessly connect the electronic product with an internet.

11 Claims, 3 Drawing Sheets

US 9,116,671 B2

STORAGE DEVICE WITH WIRELESS ROUTER FUNCTION

BACKGROUND OF THE INVENTION

1. Field of the Invention

The present invention relates to a storage device, and more particularly to a storage device with wireless router function.

2. The Related Art

At present, a storage device, such as a flash drive, is widely welcomed on account of possessing such merits as easy portability, large capacity and low price. But the storage device is only adapted for data storage.

With the development of electronic technology, a wireless router comes on the market. It is commonly connected with an Ethernet network port via a wire link, and used to wirelessly provide access to a computer network or a mobile phone etc. But the wireless router can only perform the function of wireless internet.

So, with the fast development of electronic technology, a storage device with wireless router function is required.

SUMMARY OF THE INVENTION

An object of the present invention is to provide a storage device with wireless router function. The storage device includes a main module having a base board, and a network connector. A USB controller, a memory and a router chip are located on the base board. One end of the base board is equipped with a first connector. All of the USB controller, the memory and the first connector are coupled with the router chip. The storage device is capable of performing a data storage function via electrically plugging the first connector to an external electronic product and accessing data in the memory. The network connector is electrically connected to the router chip of the base board of the main module. The network connector is capable of being further connected to a local area network via a wire link so as to make the storage device perform a wireless router function through the router chip providing a wireless LAN to wirelessly connect the external electronic product with an internet.

As described above, the main module has the memory therein so the storage device can perform the data storage function via accessing data in the memory. Moreover, the main module further has the router chip therein, and the network connector capable of being connected to the local area network via the wire link is electrically connected with the router chip so that make the storage device capable of performing the wireless router function.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
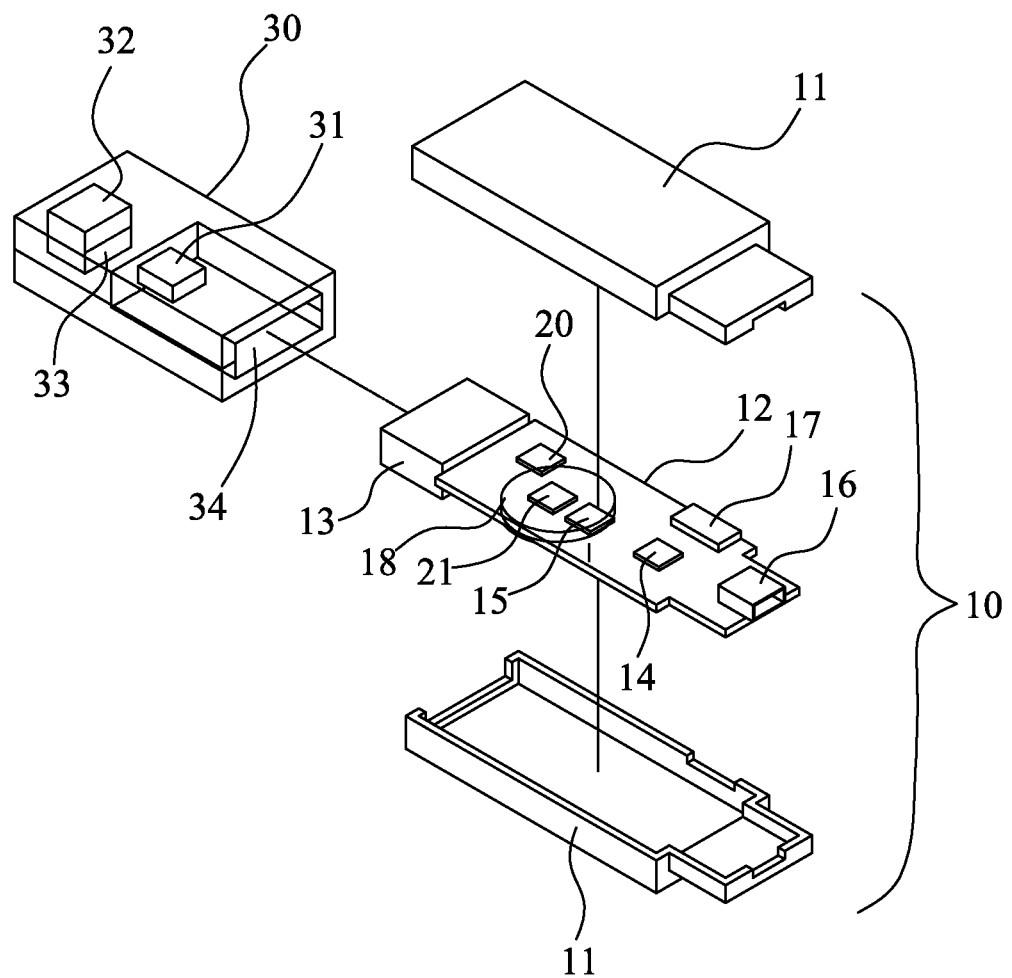
FIG. 1 is an exploded view of a storage device with wireless router function according to an embodiment of the present invention.
Figure 2:
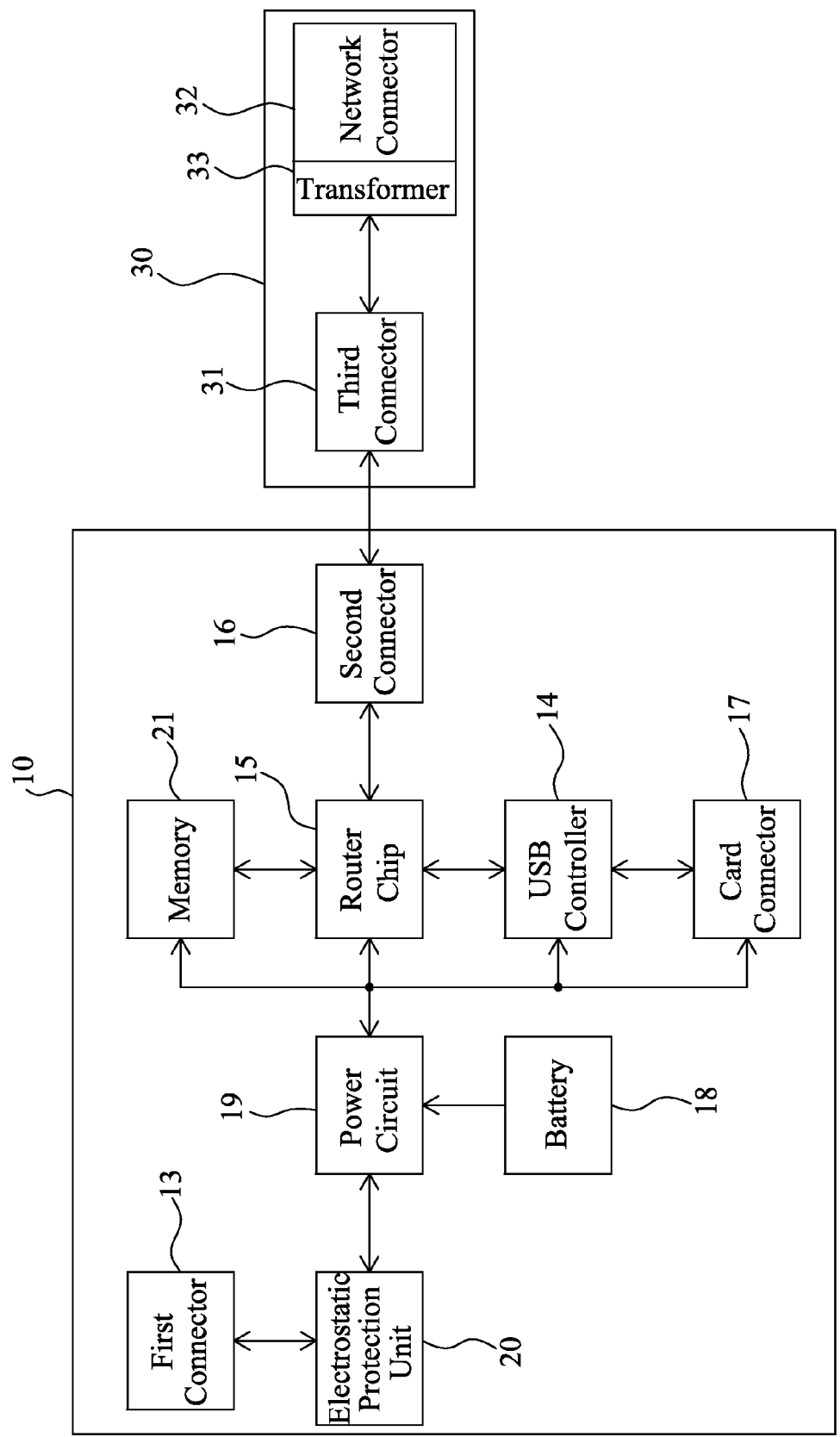
FIG. 2 is a block diagram of the storage device with wireless router function of FIG. 1.

Referring to FIG. 1 and FIG. 2, a storage device with wireless router function according to an embodiment of the present invention includes a main module 10 and a network connector 32.

The main module 10 has a shell 11 and a base board 12 mounted in the shell 11. A USB controller 14, a memory 21 and a router chip 15 are located on the base board 12. One end of the base board 12 is equipped with a first connector 13 projecting out of the shell 11. All of the USB controller 14, the memory 21 and the first connector 13 are coupled with the router chip 15. The storage device is capable of performing a data storage function via electrically plugging the first connector 13 to a connecting port 51 of an external electronic product 50 (such as a computer) shown in FIG. 3 and accessing data in the memory 21. The network connector 32 is electrically connected to the router chip 15 of the base board 12 of the main module 10. The network connector 32 is capable of being further connected to a local area network via a wire link 60 so as to make the storage device perform a wireless router function through the router chip 15 providing a wireless LAN to wirelessly connect the external electronic product 50 with an internet, as shown in FIG. 4.

In this embodiment, a Wi-Fi module (not shown) is disposed in the router chip 15 of the main module 10 to provide the wireless LAN, the network connector 32 is a RJ-45 connector and connected to an Ethernet network port via a RJ-45 wire link, and the memory 21 is a double data rate (DDR) memory.

Figure 3:
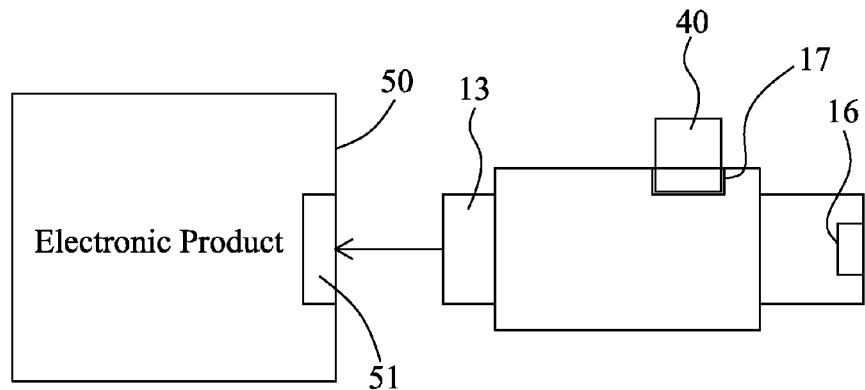
FIG. 3 is a view showing that a memory card is inserted in a main module of the storage device of FIG. 1 to make the storage device perform a data storage function.

Referring to FIGS. 1-3, the base board 12 of the main module 10 is further equipped with a card connector 17 coupled with the USB controller 14. The card connector 17 is exposed outside the shell 11 for receiving an external memory card 40 therein. The external electronic product 50 can access data in the memory card 40 via the main module 10 when the storage device performs the data storage function.

Figure 4:
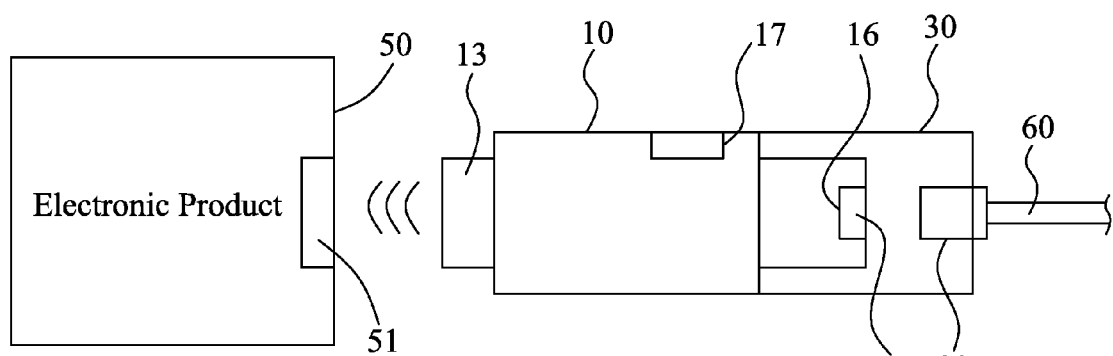
FIG. 4 is a view showing that the storage device of FIG. 1 is connected to a local area network via a wire link to perform a wireless router function.

Referring to FIG. 1, FIG. 2 and FIG. 4, the storage device further includes a cap body 30 with the network connector 32 and a second connector 31 therein. The network connector 32 is exposed out of one end of the cap body 30. The other end of the cap body 30 is concaved inward to form an inserting chamber 34. The second connector 31 is electrically connected with the network connector 32 and projects into the inserting chamber 34. The other end of the base board 12 of the main module 10 is equipped with a third connector 16 coupled with the router chip 15. The second connector 31 is mated with the third connector 16. In this embodiment, the third connector 16 and the second connector 31 are a female micro-USB connector and a male micro-USB connector, respectively. When one end of the main module 10 with the third connector 16 is inserted into the inserting chamber 34 to cap the cap body 30 thereto, the second connector 31 is electrically inserted into the third connector 16 to electrically connect the network connector 32 to the router chip 15.

Figure 5:
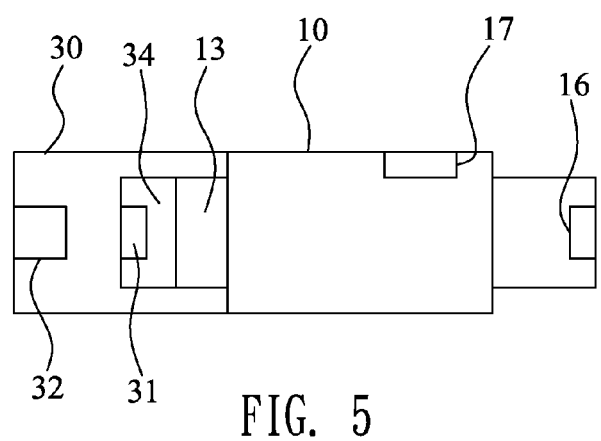
FIG. 5 is another assembly view showing that a cap body of the storage device of FIG. 1 is capped to the main module.

Referring to FIG. 5, the inserting chamber 34 of the cap body 30 is further matched with the first connector 13 in diameter. The cap body 30 is capable of being capped to the first connector 13 via inserting the first connector 13 into the inserting chamber 34. The inserting chamber 34 is longer than the part of the first connector 13 projecting out of the shell 11 to make the second connector 31 disconnect with the first connector 13 in the inserting chamber 34. In this embodiment, the first connector 13 is a male Type-A USB connector.

Referring to FIG. 1 and FIG. 2, a transformer 33 is further embedded in the cap body 30 and electrically connected between the network connector 32 and the second connector 31 for transforming signals.

Referring to FIG. 1 and FIG. 2 again, the main module 10 further includes a battery 18, a power circuit 19 and an electrostatic protection unit 20 disposed on the base board 12. The power circuit 19 is connected between the battery 18 and the router chip 15 for regulating and stabilizing power supplied by the battery 18 for the storage device. The electrostatic protection unit 20 is connected between the first connector 13 and the power circuit 19 for performing electrostatic protection function for the storage device.

As described above, the main module 10 has the memory 21 therein so the storage device can perform the data storage function via accessing data in the memory 21. Moreover, the main module 10 further has the router chip 15 therein, and the network connector 32 capable of being connected to the local area network via the wire link 60 is electrically connected with the router chip 15 so that make the storage device capable of performing the wireless router function.

What is claimed is:

1. A storage device with wireless router function, comprising: a main module having a base board, a USB controller, a memory and a router chip being located on the base board, one end of the base board being equipped with a first connector, all of the USB controller, the memory and the first connector being coupled with the router chip, the storage device being capable of performing a data storage function via electrically plugging the first connector to an external electronic product and accessing data in the memory; and a network connector electrically connected to the router chip of the base board of the main module, the network connector being capable of being further connected to a local area network via a wire link so as to make the storage device perform a wireless router function through the router chip providing a wireless LAN to wirelessly connect the external electronic product with an internet; and a cap body with the network connector and a second connector therein, the network connector being exposed out of one end of the cap body, another end of the cap body being concaved inward to form an inserting chamber, the second connector being electrically connected with the network connector and projecting into the inserting chamber, another end of the base board of the main module being equipped with a third connector coupled with the router chip, wherein the second connector is mated with the third connector, when one end of the main module with the third connector is inserted into the inserting chamber to cap the cap body thereto, the second connector is electrically inserted into the third connector to electrically connect the network connector to the router chip.

2. The storage device as claimed in claim 1, wherein a Wi-Fi module is disposed in the router chip to provide the wireless LAN.

3. The storage device as claimed in claim 1, wherein the network connector is a RJ-45 connector and connected to an Ethernet network port via a RJ-45 wire link.

4. The storage device as claimed in claim 1, wherein a transformer is electrically coupled between the network connector and the router chip for transforming signals.

5. The storage device as claimed in claim 1, wherein the memory is a double data rate memory.

6. The storage device as claimed in claim 1, wherein the base board of the main module is further equipped with a card connector coupled with the USB controller, the card connector is exposed outside the main module for receiving an external memory card therein, the external electronic product can access data in the external memory card via the main module when the storage device performs the data storage function.

7. The storage device as claimed in claim 1, wherein the inserting chamber is further matched with the first connector in diameter, the cap body is capable of being capped to the first connector via inserting the first connector into the inserting chamber, the inserting chamber is longer than a part of the first connector exposed outside the main module to make the second connector disconnect with the first connector in the inserting chamber.

8. The storage device as claimed in claim 1, wherein the first, second and third connectors are a male Type-A USB connector, a male micro-USB connector and a female micro-USB connector, respectively.

9. The storage device as claimed in claim 1, wherein a transformer is embedded in the cap body and electrically connected between the network connector and the second connector for transforming signals.

10. The storage device as claimed in claim 1, wherein the main module further includes a battery and a power circuit disposed on the base board, the power circuit is connected between the battery and the router chip for regulating and stabilizing power supplied by the battery for the storage device.

11. The storage device as claimed in claim 10, wherein the main module further includes an electrostatic protection unit disposed on the base board and connected between the first connector and the power circuit for performing electrostatic protection function for the storage device.

* * * * *